July 4, 1961  E. V. ANDERSON ET AL  2,991,140
ENCLOSURE
Filed July 6, 1959  4 Sheets-Sheet 1
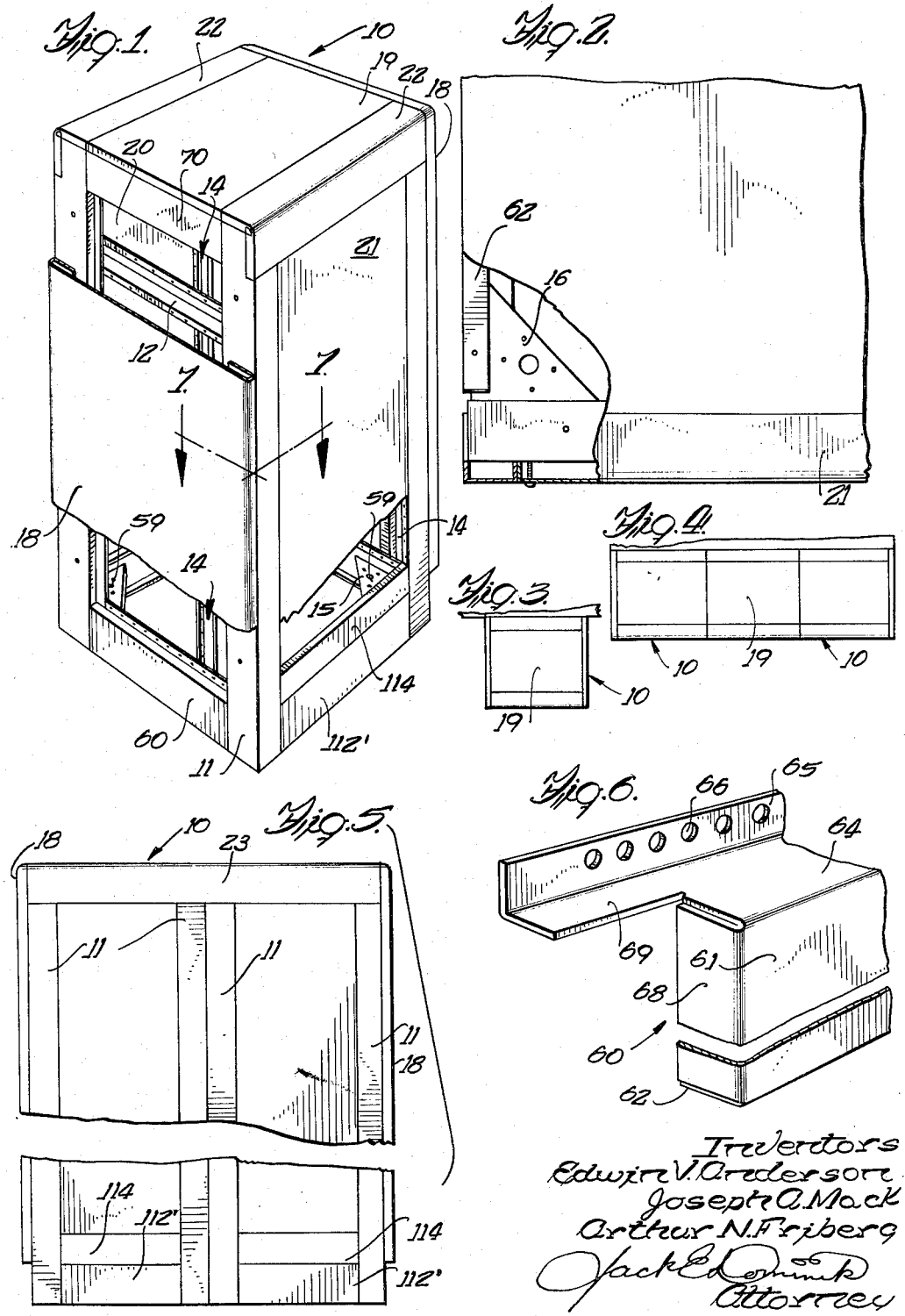

July 4, 1961 E. V. ANDERSON ET AL 2,991,140
ENCLOSURE
Filed July 6, 1959 4 Sheets-Sheet 2
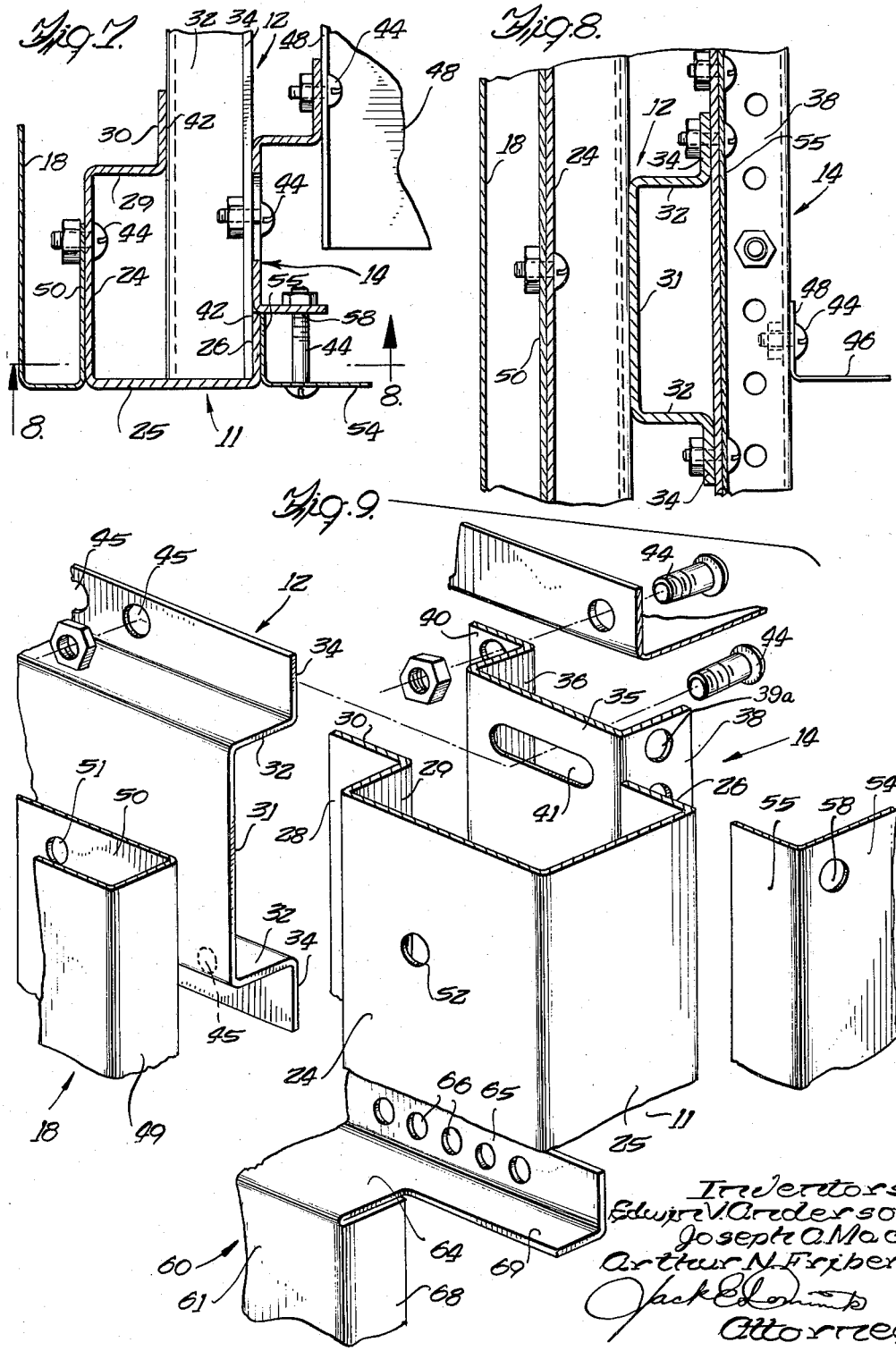

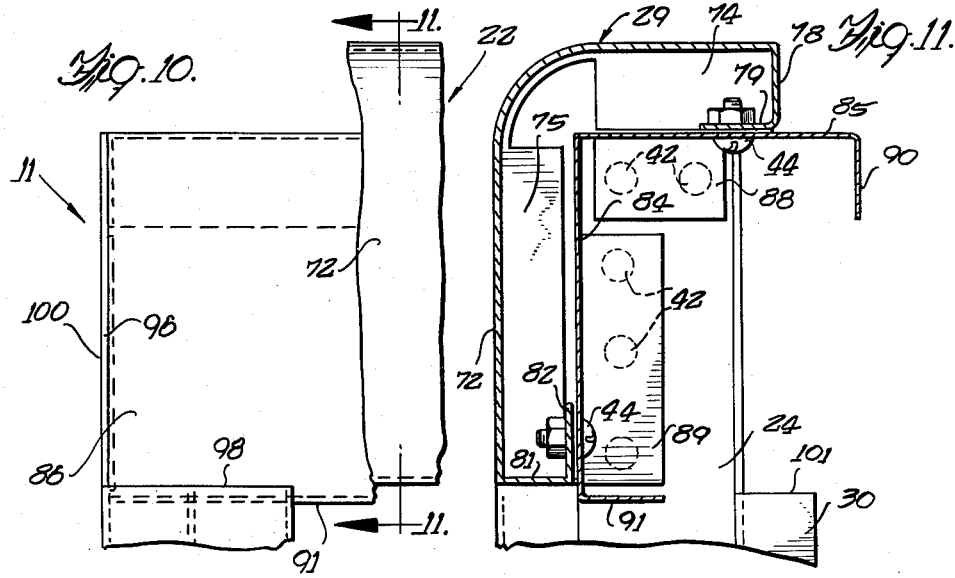

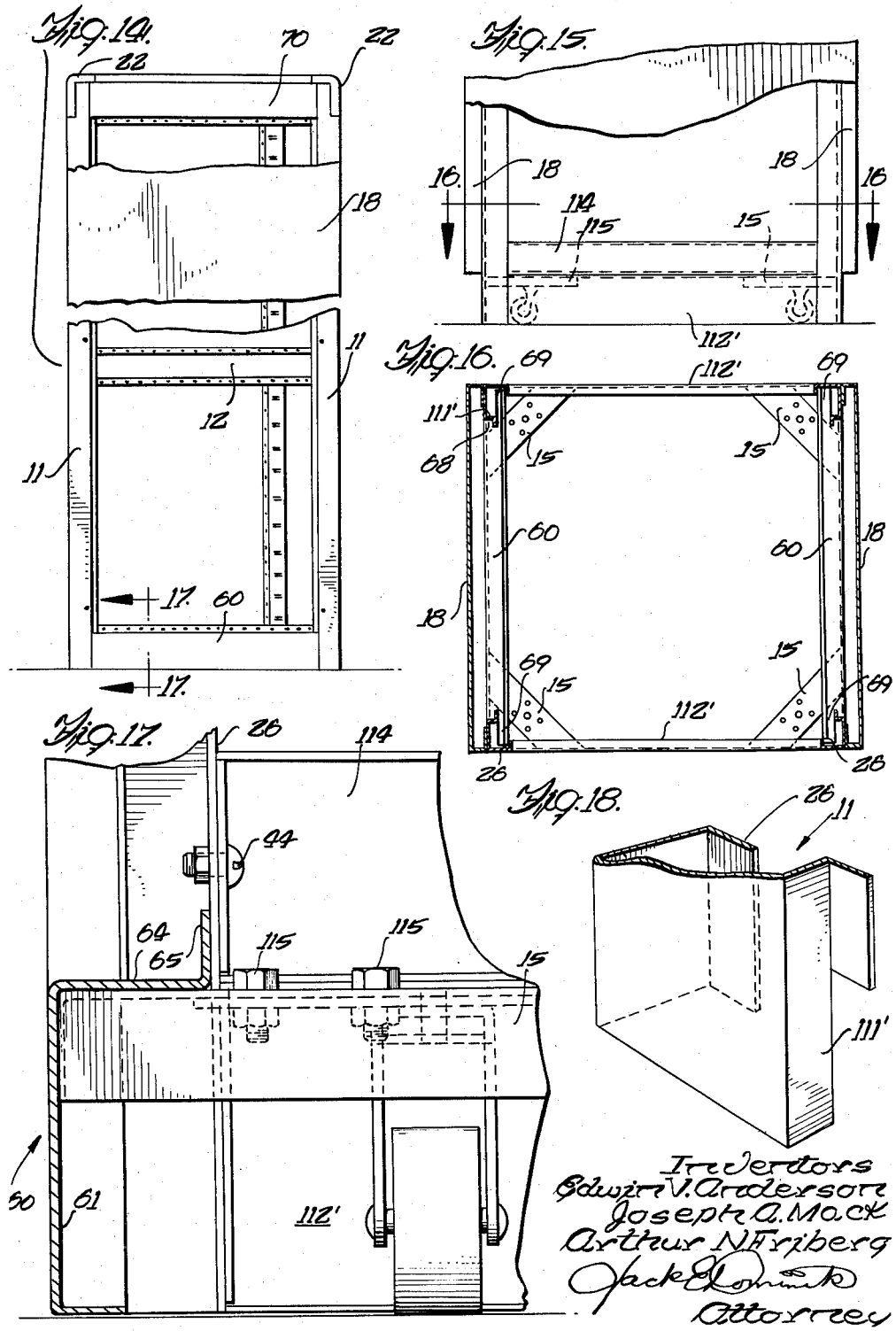

United States Patent Office 2,991,140
Patented July 4, 1961

2,991,140
ENCLOSURE
Edwin V. Anderson, Joseph A. Mack, and Arthur N. Friberg, Glenview, Ill., assignors to Amco Engineering Co.
Filed July 6, 1959, Ser. No. 825,203
16 Claims. (Cl. 312—257)

The subject invention relates to a semi-custom type modular instrument enclosure. More particularly, this is the type of instrument enclosure housing used for mounting multiples of electronic units. The subject enclosure is of the type which is used principally on the ground for housing a wide variety of communication units, testing equipment, and automation control units.

The principal object of the present invention is to provide a modular instrument enclosure unit which affords maximum utilization of the internal area enclosed by the external paneling and the internal structural framework.

A more detailed object of the invention is to provide a modular instrument enclosure system which permits the mounting of a nineteen inch standard electronic unit, such panel being of any thickness so that mounting from a flush mounting to a recessed internal mounting can be achieved within the unit, the total unit taking up the irreducible minimum of lateral space in a wall mounting.

A further object of the invention is to furnish a modular instrument enclosure unit which, because of the adjustability of its mounting members, can permit an almost infinite variety of mounting locations within the enclosure.

A further object of the invention is to provide a modular instrument enclosure with vertical and horizontal members which interrelate in such a manner as to provide maximum rigidity within the confines of a limited spatial relationship.

Another object of the present invention is to provide a modular instrument enclosure system which achieves the foregoing advantages, and yet inherently requires fewer man-hours to fabricate.

A more detailed object of the invention is to furnish an instrument enclosure system with bracing of that character which will reduce torsional distortion to a minimum, and simultaneously provide for the rolling support of the frame as well as overhead lifting and moving.

An even further object of the subject invention is to provide a modular enclosure unit with top cowling arrangement which permits the ultimate user to pack the units in multiple series with a single cowling, or employ the unit as an individual unit at his option. A related object is to furnish a removable base cowling in the subject instrument enclosure in order to accommodate the subsequent addition of various units, for example, a blower to be employed within the housing.

The foregoing objects and advantages will be more fully appreciated as the following specification proceeds, taken in conjunction with the accompanying illustrative drawings in which:

FIGURE 1 is a front perspective view partially broken of an illustrative instrument enclosure unit, the unit being shown in FIG. 1 having a door at the front portion thereof for such applications where recessed electronic units are employed, and the door closes off the front of the panel when out of use.

FIG. 2 is a top, enlarged, partially broken view of the enclosure unit shown in FIG. 1 illustrating the top gusset and lifting element.

FIG. 3 is a top diagrammatic view of a single unit illustrating how it would appear when employed against a wall.

FIG. 4 is a top partially diagrammatic view of several of the instrument enclosure units mounted together.

FIG. 5 is a front partially broken elevation of a multiple mounting of two of the subject instrument enclosure units.

FIG. 6 is a front perspective partially broken view of an end of a bottom strut.

FIG. 7 is a top partially sectioned, partially broken view of a corner of the enclosure unit taken along section line 7—7 of FIG. 1.

FIG. 8 is a front elevation in section of a corner of the enclosure unit taken along section line 8—8 of FIG. 7.

FIG. 9 is an enlarged, perspective, exploded, partially broken view of a corner of the enclosure unit taken in the general area of section 7—7 of FIG. 1, and viewed from the same vantage point as FIG. 1.

FIG. 10 is a front elevation of an upper corner of the enclosure unit shown in FIG. 1 with the top cowling partially broken away, and the bottom terminating at the vertical frame member.

FIG. 11 is an enlarged partially broken transverse sectional view of the crosstie across the top of the enclosure taken along section line 11—11 of FIG. 10.

FIG. 12 is an enlarged, partially broken, perspective exploded view of the top corner of the instrument enclosure unit, taken from the same vantage point as shown in FIG. 1 and showing the top corner directly above the point where section 7—7 has been taken.

FIG. 13 is a perspective view of the top gusset plate.

FIG. 14 is a side view of the subject enclosure partially broken to show the mounting portions for the enclosed units.

FIG. 15 is an enlarged broken view of the lower portion of the front of an enclosure showing the caster mounting means in phantom lines.

FIG. 16 is a transverse sectional view looking downwardly towards the lower portion of the enclosed units taken along section 16—16 of FIG. 15.

FIG. 17 is an enlarged partially broken sectional view of a bottom strut taken along section 17—17 of FIG. 14 and showing, partially in phantom lines, the caster mounting.

FIG. 18 is a broken perspective view of a vertical frame member at its lower end showing the cut-out portions adapted for attachment to the bottom strut.

In essence, the invention of the subject enclosure unit 10 contemplates pairs of opposed vertical frame members 11, the opposed members being mirror images of opposite members. Cooperating with the vertical opposed pairs of frame members are horizontal center struts 12, the edge flanges of which interfit with the vertical frame member flanges to form a rigid joint. Vertical panel mounting members 14 are secured selectively at infinitely variable fore and aft intervals along the horizontal center struts 12. By the provision of caster gussets 15 at the bottom corners of the unit, and lifting gussets 16 at the top of the unit, rigidity is imparted against torsional deflection and simultaneously means are provided for mobilizing the unit and lifting the unit for transportation from place to place.

The subject enclosure as shown in FIG. 1 is susceptible of a complete housing through the provision of a pair of side panels 18, a top panel 19 and a rear panel 20. In the unit disclosed in FIG. 1, a front door 21 has been hingedly mounted at the forward portion of the unit. By the use of a door as well as a side panel advantageous configurations are made possible with the understood construction. For example, FIG. 3 shows the top of a single enclosure unit such as FIG. 1. In FIG. 4, however, there is shown a top view of three such enclosure units, with the side panels 18 being omitted from the center unit and the sides of the flanking units so that the frames can be joined or unitized. In FIG. 5 there is shown a pair of enclosure units joined at their adjacent sides. It is possible with the subject enclosure to employ individual top cowlings 22, or a single top cowling 23, such as shown in FIG. 5, may be utilized.

By referring to FIG. 9, the basic structural relationship between the vertical panel mounting members 14, vertical frame members 11, and horizontal center struts 12 will be best understood. The basic building block is the vertical frame member 11 which is hook-shaped in cross section. The vertical frame member is most conveniently formed from a single piece of sheet metal bent to define a back 24 and end 25. The back 24 and end 25 are at right angles to each other, the end 25 terminating in a flange 26 which is parallel and opposed to the back 24. The other end of the back 24 terminates in a reversely bent L-shaped flange 28, the reversely bent L-shaped flange having a depending leg 29 and an extending leg 30. The depending leg 29 is parallel and opposed to the vertical frame member end 25, and the extending leg 30 of the reversely bent L-shaped flange 30 is parallel with the end flange 26.

The horizontal center strut 12 is a shallow channel-like member formed by bending sheet metal and has a back portion 31 flanked by legs 32, each of the legs terminating in a laterally extending pair of flanges 34. The flanges 34 are parallel with the back 31 and perpendicular with the legs 32. The horizontal center strut elements are so proportioned that the total depth of the unit including the thickness of the back 31 and flanges 34 is equal to the perpendicular distance between the vertical frame member end flange 26 and reversely bent L-shaped flange extending leg 30. In this manner, as illustrated in FIGS. 7 and 9, the horizontal center struts 12 conveniently nest within the vertical frame member 11 when mounted in perpendicular relationship. The remainder of the components are proportioned and oriented to harmonize with this relation to define an enclosure susceptible of a wide variation in proportion, and yet providing for a maximized utilization of space.

In order to mount the various electronic units or other devices within the subject enclosure, vertical panel mounting members 14 are provided for use in cooperation with the vertical frame members 11 at the respective corner of the enclosure 10. With reference to FIGS. 7, 8 and 9, it will be seen that the vertical panel mounting member 14 is formed basically from a single sheet of material as are the other members, in the shape of a channel having a single mounting flange extending from one leg. More specifically, the vertical panel mounting member contemplates a back 35, an imperforate leg 36 and a parallel mounting leg 38 containing a plurality of spaced mounting holes 39. The depending mounting flange 40 extends from the imperforate leg 36 and also includes a plurality of mounting holes 39a. Elongated transverse mounting slots 41 are provided at spaced intervals in the back 35 of the vertical panel mounting members 14.

The horizontal center struts 12 are permanently affixed as by welds generally designated by the reference numeral 42, to the vertical frame members 11. The vertical panel mounting members 14, however, are secured by means of removable fasteners such as the nuts and bolts 44 as shown in the drawings. It will be understood that various other equivalent fastener members are readily adaptable for use in the equivalent fashion as the nuts and bolts shown. The elongated mounting hole 41 in the back of the vertical panel mounting member 14 permits lateral adjustment in the intervals between the spaced mounting holes 45 on the flanges 34 of the horizontal center struts 12. The mounting holes 39 and the depending mounting flange 40 of the vertical panel mounting members 14 may be utilized to support a shelf 46 by securing its depending flange portion 48 by means of nuts and bolts 44 to the depending mounting flange 40.

The side panels 18, as illustrated best in FIGS. 7 and 9, have a side panel reversely bent end mounting portion defined by side panel end 49 and side panel mount 50. The side panel mount 50 is provided with suitable mounting holes 51. Corresponding side panel mounting holes 52 are provided in the back 24 of the vertical frame member 11 whereby the side panel mount is securely fixed to the vertical frame member back 24.

In the event a front panel 54 is employed to enclose the front of the enclosure 10, support flange 55 with mounting holes 58 is used in conjunction with fasteners 44 for adjustment across the front of the enclosure. The support flange 55 is then secured by means of fasteners firmly against the mounting leg 38 of the vertical panel mounting member 14. It will be readily understood that the back corners of the enclosure as well as the opposite corners are but mirror images of the opposite corners described above and shown in detail in FIGS. 7, 8 and 9.

Having described above the heart of the corner sections and mounting means, the finishing up of the enclosure with the bottom strut 60 will be better understood. Referring first to FIG. 6, it will be seen that the bottom strut 60 includes a modified channel type body having a back 61, a short leg 62, and a long leg 64. The long leg 64 terminates in a lateral mounting flange 65 which is provided with a plurality of bottom strut mounting holes 66 spaced in accordance with the pattern employed in the other mounting holes throughout the enclosure. The flange 65 may vary in depth, and also in the axial location of the mounting holes 66. The end of the bottom strut is finished up by reversely folding a portion of the back 60 to define a vertical frame member butt plate 68. The lateral mounting flange and an extension of the long leg 69 extend forwardly in order to interfit with the area in the vertical frame member defined by the distance between the end flange 26 and extended leg 30 of the reversely bent L-shaped flange 38. The mounting holes 66 of the bottom strut 60 are then utilized in combination with the elongated mounting holes 41 on the back 35 of the vertical panel mounting members 14. Thus when the bottom strut is securely interfitted with the vertical frame member butt plate 68 of the bottom strut 60 flushes against the depending leg 29 of the reversely bent L-shaped flange 28, the lower portion of the extending leg 30 of the reversely bent L-shaped flange 28 being cut away to permit flushing and the insertion of the long leg extension 69 of the bottom strut 60. The bottom strut piece is inverted and then becomes a top strut 70, and is secured in place in a similar manner to the upper end of the vertical frame member.

It will be observed in FIG. 1 that caster gussets 15 are provided at the four corners at the bottom of the unit. The caster gussets are channel members, beveled at their ends, with the ends flushing against the bottom strut back 61, and their upper portions suitably secured to the bottom strut long leg 64 as by welding or other convenient fastening means. Casters, not shown, are secured by means of caster fastening bolts 59 to the bottom gussets 15 with provisions for adjusting the relative height of the caster determined by the needs of the specific customers.

By referring to FIGS. 10 through 12, the construction of the front and rear cross members will be better understood. An external top cowling 22 is formed from a single curved piece having a top and front portion 72. The ends are finished up respectively in a top flange 74 and a front flange 75. The top of the cowl 71 terminates in a reversely bent mounting flange 76 having a butt portion 78 and a depending mounting ledge 79. The bottom edge of the front 72 of the top cowling terminates in a bottom reversely bent mounting flange 80 having bottom butt plate portions 81 and a reversely bent mounting flange portion 82.

A cross-tie member 84 traverses the space between the opposed vertical frame members at the front and rear of the enclosure. The cross-tie 84 contemplates a right angle member having a top brace leg 85 and a front brace leg 86. The ends of the cross-tie are provided with a top brace depending flange 88 and a front brace depending flange 89. In addition the top brace and front brace are provided with edge flanges 90, 91 respectively. The reversely bent mounting flange 79 is provided with mounting holes 92 as well as the reversely bent mounting flange 82 being provided with mounting holes 94 which are coordinated with the top brace leg mounting holes 94 and front leg mounting holes 95. By suitable bolts or other fastening members 44, as best illustrated in FIG. 11, the top cowl 22 is secured in place to the cross-tie 84.

The upper end of the vertical frame member 11 is cut away in order to define cowl mating edges 96, 97, 98, 99. In addition, the cut away portion defines a cross-tie mounting portion 100 to which the cross-tie depending flanges 88, 89 are secured as by welds 42. Additionally, the vertical frame member 11 has the extending leg 30 of the reversely bent L-shaped flange 28 foreshortened to define the end 101 as shown in the dotted-line in FIG. 12 to receive the extension 69 of the top strut 70. The rear cowl 22 and the rear cross-tie 84 are substantially mirror images of the front members as just shown and described in detail.

The corner members are completed by the addition of a lifting gusset member 16 shown in principal detail in FIG. 13. The lifting gusset member is provided with a generally triangular back plate 102 with depending side flanges 104, 105. A depending rear flange 106 along the hypotenuse of back plate 102 extends to approximately twice the depth of the side flanges 104, 105. The rear flange 106 terminates in mounting end plates 108, 109 which are generally co-planar with the side flanges 104, 105. In an alternative form the lower edge of the rear flange 106 is flush with the lower edges of the side flanges 104, 105. A reinforced threaded boss 110 extends downwardly from the back plate 102 and may selectively receive a mounting eye. Suitable means are provided by way of holes 111, 112 for mounting the lifting gusset 16 respectively to the cross-tie 84 and the top strut 62 in the location indicated in FIG. 2. The mounting end plates 108, 109 are secured, preferably by welding, respectively to the top strut 70 and front brace leg 86 of the cross-tie 84 with the various depending side flanges extending downwardly.

The construction of the top cowling 22 and its relative relationship to the cross-tie 84 is the same in the front of the enclosure as in the rear. This relationship is best illustrated in FIGS. 1 and 14. Similarly the bottom strut 60 is of substantially the same configuration on each side of the unit. The vertical frame member 11 is cut away at its lower portion as shown in FIG. 18 to provide a vertical frame member butt plate 111′ to mate against the bottom strut butt plate 68. The lower leg extension 69 of the bottom strut 60 extends to the rear portion of the corner joint as shown in FIG. 16. The base cross-tie 112′ is a generally rectangular member having flange portions at all edges which are secured against the vertical frame member end flange 26 at both the front and rear of the unit. In addition a base cowl 114 is removably secured above the base cross-tie 112′ to the vertical frame member end flange 26 as shown in FIG. 17, and is secured by means of a bolt type fastener 44. The caster bracket 15 is secured at one end to the flange at the upper portion of the base cross-tie 112 by means of bolts 115. At its other portion, the caster bracket 15 is secured to the bottom strut 60 either by weldments or bolts as discussed above.

After the entire frame is assembled in accordance with the foregoing description, the various panels 18, 19, 20 are secured in place in the manner described above. Either a hinged front door 21 or front cowling may be employed in front of the unit to complement the rear panel in the rear of the unit. The completed construction, as shown in FIGS. 3, 4 and 5 is susceptible of mounting as a single unit, a pair of units or three units. Maximum utilization of the internal space unencumbered by structural members is readily achieved, while a rugged interfit at the corners is effected. Additionally, the unit is mobilized by caster gusset plates at the lower portion, and upper, adaptable for lifting by removing the top panel and securing lifting eyes in the lifting gusset 16 at the upper corners of the unit.

Althuogh particular embodiments of the invention have been shown and described in full here, there is no intention to thereby limit the invention to the details of such embodiments. On the contrary, the invention is to cover all modifications, alternatives, embodiments, usages and equivalents of the enclosure as fall within the spirit and scope of the invention, specification and the appended claims.

We claim:

1. An instrument enclosure unit having a rectangular frame comprising, in combination, pairs of opposed vertical frame members, each vertical frame member having a back and an end portion at right angles to each other, an end flange at the edge of the end portion of the vertical frame member extending parallel with the back portion and opposed thereto, a reversely bent L-shaped flange extending from the edge of the back of the vertical frame member, said L-shaped flange having one portion parallel to and in spaced longitudinally offset relation with the end flange, a horizontal center strut, the depth of the horizontal center strut being substantially equal to the spaced relation between flanges of the vertical frame member whereby the horizontal center strut nests in perpendicular relation to the vertical frame member for attachment thereto, a bottom strut, means at the end of said bottom strut for nesting with the vertical frame member between its said spaced flanges, a top strut having means at its end for nesting with the vertical frame within its said spaced flanges, cross-tie means for joining opposite sides of said enclosure, vertical mounting members, means for removably securing said vertical mounting members to the horizontal center struts whereby the vertical mounting members are employed to mount various units interiorly of said enclosure.

2. An instrument enclosure unit having a rectangular frame comprising, in combination, pairs of opposed vertical frame members, each vertical frame member having a back and an end portion at right angles to each other, an end flange at the edge of the end portion of the vertical frame member extending parallel with the back portion and opposed thereto, a reversely bent L-shaped flange extending from the edge of the back of the vertical frame member, said L-shaped flange having one portion parallel to and in spaced longitudinally offset relation with the end flange, a horizontal center strut having a central channel portion and flanking side mounting flanges, the depth of the horizontal center strut being substantially equal to the spaced relation between flanges of the vertical frame member whereby the horizontal center strut nests in perpendicular relation to the vertical frame member for attachment thereto, a bottom strut, means at the end of said bottom strut for nesting with the vertical frame member between its said spaced flanges, a top strut having means at its end for nesting with the vertical frame within its said spaced flanges, cross-tie means for joining opposite sides of said enclosure, vertical panel mounting members, means for securing the said vertical panel mounting members to the horizontal center struts whereby the vertical panel mounting members are employed to mount various units interiorly of said enclosure.

3. An instrument enclosure unit having a rectangular frame comprising, in combination, pairs of opposed vertical frame members, the opposed side pairs of vertical frame members oriented as mirror images of each other, the vertical member having a back and an end portion at right angles to each other, an end flange at the edge of the end portion of the vertical frame member extending parallel with the back portion and opposed thereto, a reversely bent L-shaped flange extending from the edge of the back of the vertical frame member, said L-shaped flange having one portion parallel to and in spaced longitudinally offset relation with the end flange, a horizontal center strut having a central channel portion and flanking side mounting flanges, the depth of the horizontal center strut being substantially equal to the spaced relation between flanges of the vertical frame member whereby the horizontal center strut nests in perpendicular relation to the vertical frame member and the respective flanges are secured to the opposite member, a bottom strut, means at the end of said bottom strut for nesting with the vertical frame member between its said spaced flanges, a top strut being an inverted bottom strut and having means at its end for nesting with the vertical frame within its said spaced flanges, cross-tie means for joining opposite sides of said enclosure, vertical panel mounting members, means for securing the said vertical panel mounting members to the horizontal center struts whereby the vertical panel mounting members are employed to mount various units interiorly of said enclosure.

4. An instrument enclosure unit having a rectangular frame comprising, in combination, pairs of opposed vertical frame members, each vertical member having a back and an end portion at right angles to each other, an end flange at the edge of the end portion of the vertical frame member extending parallel with the back portion and opposed thereto, a reversely bent L-shaped flange extending from the edge of the back of the vertical frame member, said L-shaped flange having one portion parallel to and in spaced relation with the end flange, a horizontal center strut, the depth of the horizontal center strut being substantially equal to the spaced relation between flanges of the vertical frame member whereby the horizontal center strut nests in perpendicular relation to the vertical frame member and the respective flanges can be secured to the opposite member, a bottom strut, means at the end of said bottom strut for nesting with the vertical frame member between its said spaced flanges, a top strut having means at its end for nesting with the vertical frame within its said spaced flanges, cross-tie means for joining opposite sides of said enclosure, vertical panel mounting members having a channel-shaped body portion with a back and parallel legs, mutually perpendicular with the back, a mounting flange extending laterally from one of said legs and having spaced mounting holes, spaced mounting holes in the leg opposite said mounting flange, and lateral elongate holes in the back of said mounting flange whereby said vertical channel mounting member is secured to the mounting flanges of the horizontal center struts and the vertical panel mounting member flange is employed to mount various units interiorly of said enclosure.

5. An instrument enclosure unit having a rectangular frame comprising, in combination, pairs of opposed vertical frame members, the opposed side pairs of vertical frame members oriented as mirror images of each other, each vertical member having a back and an end portion at right angles to each other, an end flange at the edge of the end portion of the vertical frame member extending parallel with the back portion and opposed thereto, a reversely bent L-shaped flange extending from the edge of the back of the vertical frame member, said L-shaped flange having one portion parallel to and in spaced relation with the end flange, a horizontal center strut having a central channel portion and flanking side mounting flanges, the depth of the horizontal center strut being substantially equal to the spaced relation between flanges of the vertical frame member whereby the horizontal center strut nests in perpendicular relation to the vertical frame member and the respective flanges can be secured to the opposite member, a bottom strut, said bottom strut having an upwardly oriented lateral mounting flange, means at the end of said bottom strut for nesting with the vertical frame member between its said spaced flanges, a top strut being an inverted bottom strut and having means at its end for nesting with the vertical frame within its said spaced flanges, cross-tie means for joining opposite sides of said enclosure, vertical panel mounting members having a channel-shaped body portion with a back and parallel legs, a mounting flange extending laterally from one of said legs and having spaced mounting holes, spaced mounting holes in the leg opposite said mounting flange, and lateral elongate holes in the back of said mounting flange whereby said vertical panel mounting member is secured to the mounting flanges of the horizontal center struts and the vertical channel mounting members are employed to mount various units interiorly of said enclosure.

6. An instrument enclosure unit having a rectangular frame comprising, in combination, pairs of opposed vertical frame members, the opposed side pairs of vertical frame members oriented as mirror images of each other, each vertical member having a back and an end portion at right angles to each other, an end flange at the edge of the end portion of the vertical frame member extending parallel with the back portion and opposed thereto, a reversely bent L-shaped flange extending from the edge of the back of the vertical frame member, said L-shaped flange having one portion parallel to and in spaced longitudinally offset relation with the end flange, a horizontal center strut, the depth of the horizontal center strut being substantially equal to the spaced relation between flanges of the vertical support member whereby the horizontal center strut nests in perpendicular relation to the vertical support and the respective flanges can be secured to the opposite member, a bottom strut, means at the end of said bottom strut for nesting with the vertical frame member between its said spaced flanges, a top strut being an inverted bottom strut and having means at its end for nesting with the vertical frame within its said spaced flanges, cross-tie means for joining opposite sides of said enclosure, vertical panel mounting members, means for mounting said vertical mounting member to the horizontal center struts whereby the vertical channel mounting member is employed to mount various units interiorly of said enclosure.

7. In an enclosure of the character defined in claim 6, wherein cross-tie means includes top cross-ties at the front and rear, each cross-tie having an L-shaped cross brace section with two legs, said legs each having depending mounting flanges at their ends, and a cross-tie cowling, said cowling having an L-shaped body with a rounded portion joining two legs, reversely bent flanges at the ends of said legs for mounting said cowling removably to the cross brace portion, the whole in such combination as to provide a cross-tie at the front and rear of the enclosure with a removable cowl portion.

8. In an enclosure of the character defined in claim 7, a lifting gusset, said lifting gusset having a body with a right triangular configuration, depending mounting flanges on the perpendicular legs of said triangle, a single flange depending from the hypotenuse leg of said triangle the ends of which are bent to be co-planar with the leg depending flanges, said flanges being secured to cross brace and top strut respectively.

9. In an enclosure of the character defined in claim 6, a base cross-tie of rectangular configuration having side and end edges, base cross-tie flanges on all the sides and end edges, the end flanges being proportioned to abut the end flange of the vertical frame member.

10. An instrument enclosure unit having a frame comprising, in combination, pairs of opposed vertical frame members, each vertical member having a back and an end portion at right angles to each other, an end mounting flange at the edge of the end portion of the vertical frame member extending parallel with the back portion and opposed thereto, a reversely bent L-shaped mounting member extending from the edge of the back of the vertical frame member, said L-shaped mounting member having one portion defining a mounting flange parallel to and in spaced longitudinally offset relation with the end mounting flange, a horizontal center strut having a central channel portion and side mounting flanking flanges on the legs of the channel portion, said center strut having a depth to fit between the end flange and the mounting flange parallel with the end flange and being secured at each end to one of said vertical members at an intermediate place on at least one of the mounting flanges to thereby connect together one of said pairs of opposed vertical frame members, strut means for joining the thus defined pair of vertical frame members at top and bottom, and cross-tie means for joining together at least two of said pairs, thereby defining a frame.

11. An instrument enclosure unit having a rectangular frame comprising, in combination, pairs of opposed vertical frame members, each vertical member having a back and an end portion at right angles to each other, an end mounting flange at the edge of the end portion of the vertical frame member extending parallel with the back portion and opposed thereto, a reversely bent L-shaped mounting member extending from the edge of the back of the vertical frame member, said L-shaped mounting member having one portion defining a mounting flange parallel to and in spaced longitudinally offset relation with the end mounting flange, a horizontal center strut having a central channel portion and side mounting flanking flanges extending from the ends of the legs away from the central channel portion, said center strut having a depth no greater than the spaced relation between the end flange and the mounting flange parallel with the end flange, such center end strut being secured at each end to one of said vertical members at an intermediate place on at least one of the mounting flanges to thereby connect together the vertical frame members comprising one of the pairs, strut means for joining the thus defined pair of vertical frame members at the top and bottom thereof, cross-tie means for joining together at least two of the pairs thus defined, and vertical panel mounting members removably secured to the mounting flanges of the horizontal center strut whereby the vertical panel mounting members are employed to mount various units interiorly of said enclosure.

12. An instrument enclosure unit according to claim 11 wherein said vertical panel mounting members have a channel-shaped body portion with a back and parallel legs mutually parallel with the back, a mounting flange extending laterally from one of said legs, means on the vertical panel mounting member flange and on the leg opposite said flange for receiving means to mount units interiorly of the enclosure, and lateral elongate holes in the back of said mounting flange whereby said vertical channel mounting member is secured to the mounting flanges of the horizontal center struts.

13. A unitary enclosure comprising at least two like-constructed instrument enclosure units of equal height with frame members defining opposite sides of each unit disposed adjacent each other with the front side of the units aligned, wherein each such unit has a rectangular frame that includes, in combination, a pair of sides each of which pair is defined by pairs of opposed vertical frame members, each vertical frame member having a back and an end portion at right angles to each other, an end flange at the edge of the end portion of the vertical frame member extending parallel with the back portion and opposed thereto, a reversely bent L-shaped flange extending from the edge of the back of the vertical frame member, said L-shaped flange having one portion parallel to and in spaced relation with the end flange, the end flange and the one portion extending perpendicular to the front side, a top strut having means at its end that fit in a spaced relation between the end flange and the portion parallel therewith and is secured to at least one of the end flanges and the portion parallel therewith to thereby define a side that includes two opposed vertical frame members, top cross-ties extending between front and back ones of each vertical frame member on two sides to thereby define a rectangular frame, each cross tie having an L-shaped cross section with two legs, means for securing at least one of said legs to the back of the vertical frame member, and a cross-tie cowling extending entirely across the aligned fronts of said at least two units, said cowling having an L-shaped body portion joining two legs, reversely bent flanges at the end of said legs for mounting said cowling removably to the front cross-ties of the units across which the cowling extends, the whole in such combination as to provide a cross-tie at the front of each individual enclosure with a removable cowl portion extending across a plurality of units.

14. A unitary enclosure in accordance with claim 13, wherein the end portion and a part of the back portion of the upper end of the vertical frame members are cut away to an extent that a shoulder is thereby formed, and said cross-tie cowling is disposed across cutout portions in alignment with said shoulder.

15. An instrument enclosure unit having a frame comprising, in combination, pairs of opposed vertical frame members, the opposed side pairs of vertical frame members oriented as mirror images of each other, vertical member having a back and an end portion at right angles to each other, an end mounting flange at the edge of the end portion of the vertical frame member extending parallel with the back portion and opposed thereto, a reversely bent L-shaped mounting member extending from the edge of the back of the vertical frame member, said L-shaped mounting member having one portion parallel to and in spaced longitudinally offset relation with the end mounting flange, a horizontal center strut, the depth of the horizontal center strut being substantially equal to the spaced relation between the mounting flanges of the vertical support member whereby the horizontal center strut nests in perpendicular relation to the vertical support between the respective mounting flanges, a bottom strut, means at the ends of said bottom strut for attachment to the vertical frame members, a top strut, means at the ends of the top strut for joining with the vertical frame members, cross-tie means for joining opposite sides of said enclosure, vertical channel mounting members, means for mounting said vertical mounting member to the horizontal center struts whereby the vertical channel mounting member is employed to mount various units interiorly of said enclosure.

16. An instrument enclosure unit in accordance with claim 15 wherein the upper end of the vertical frame members is cut away by removing all of the end portion, the end flange attached thereto and a part of the back portion to define a cowling mating structure, top cross-ties at the front and rear extending between the portions remaining of the upper ends of said vertical frame members, means for attaching said top cross-ties to the remaining portion of the upper ends heretofore described, each cross-tie having an L-shaped cross section with two legs, and a cross-tie cowling having an L-shaped body with two legs extending therefrom, reversely bent flanges at the ends of said legs for mounting said cowling removably to at least one of said cross-ties.

References Cited in the file of this patent

UNITED STATES PATENTS

| | | |
|---|---|---|
| 1,836,901 | Caldwell et al. | Dec. 15, 1931 |
| 2,078,581 | Muller | Apr. 27, 1937 |
| 2,196,399 | Rubel | Apr. 9, 1940 |
| 2,438,108 | Barler et al. | Mar. 23, 1948 |
| 2,520,506 | Mankki | Aug. 29, 1950 |
| 2,691,562 | West | Oct. 12, 1954 |
| 2,831,745 | Parmet | Apr. 22, 1958 |
| 2,912,294 | Wells et al. | Nov. 10, 1959 |